(12) United States Patent
Shikama

(10) Patent No.: US 12,704,767 B2
(45) Date of Patent: Aug. 11, 2026

(54) SHOOTING APPARATUS, CAMERA, AND ELECTRONIC DEVICE

(71) Applicant: AAC Optics (Nanning) Co., Ltd., Nanning (CN)

(72) Inventor: Kazuo Shikama, Osaka (JP)

(73) Assignee: AAG Optics (Nanning) Co., Ltd., Nanning (CN)

( * ) Notice: Subject to any disclaimer, the term of this patent is extended or adjusted under 35 U.S.C. 154(b) by 522 days.

(21) Appl. No.: 18/330,331

(22) Filed: Jun. 6, 2023

(65) Prior Publication Data

US 2023/0400751 A1 Dec. 14, 2023

(30) Foreign Application Priority Data

Jun. 8, 2022 (JP) .................................. 2022092912

(51) Int. Cl.
*G03B 13/36* (2021.01)
*G03B 30/00* (2021.01)

(52) U.S. Cl.
CPC ............. *G03B 13/36* (2013.01); *G03B 30/00* (2021.01)

(58) Field of Classification Search
CPC .......... G03B 30/00; G03B 3/10; G02B 13/00; G02B 13/36; G02B 7/09
See application file for complete search history.

(56) References Cited

U.S. PATENT DOCUMENTS

2019/0230262 A1* 7/2019 Wang ..................... G09G 5/003
2021/0132329 A1* 5/2021 Lim ......................... G03B 3/10
2023/0305362 A1* 9/2023 Lee ...................... G02B 27/646

FOREIGN PATENT DOCUMENTS

CN 108732713 A * 11/2018 ............... G02B 7/09
JP 2018180352 A 11/2018

* cited by examiner

*Primary Examiner* — Bumsuk Won
*Assistant Examiner* — Alex Park Rickel
(74) *Attorney, Agent, or Firm* — Wiersch Law Group

(57) ABSTRACT

A shooting apparatus, a camera, and an electronic device, related to a field of optical technologies, are provided. According to the shooting apparatus, in order to fix the lens assembly, the focusing magnets and the fixing magnetic yokes are used to replace a leaf spring. Then, by energizing the focusing coils, the lens assembly realizes autofocus under the action of the forces of attraction between the focusing magnets and the focusing coils. Therefore, the shooting apparatus can realize focusing and fix the lens assembly without using the leaf spring. This prevents the autofocus mechanism from malfunction caused by easy damage of the leaf spring, and reduces the size and weight of the shooting apparatus, thereby improving the performance of the autofocus mechanism.

12 Claims, 17 Drawing Sheets

SHOOTING APPARATUS, CAMERA, AND ELECTRONIC DEVICE

TECHNICAL FIELD

The present disclosure relates to the field of shooting apparatus focusing technologies, and in particular to a shooting apparatus, a camera, and an electronic device.

BACKGROUND

As shooting technologies rapidly develop, a shooting apparatus with a lens drive structure has been applied to various portable electronic devices, such as mobile phones, tablets, tablets, and the like. The lens drive structure of commonly used portable electronic devices includes an autofocus mechanism that implements focus adjustment in an optical axis direction. Typically, the autofocus mechanism includes a leaf spring.

However, in small devices mounted on the portable electronic devices, an elastic support component of the autofocus mechanism with a large focusing range is a leaf spring, which is configured to achieve elastic support and fixation of a lens assembly. In the case that a drive range and a weight of the lens assembly are large, the leaf spring may be damaged and permanently deformed due to stress concentration, or may be broken or detached caused by falling, resulting in malfunction of the autofocus mechanism. If the strength of the leaf spring is enhanced by thickening the leaf spring, the spacing between the upper and lower plates is narrowed. Since the leaf spring essentially has a spring suspension structure, it will generate a secondary resonance led by a first resonance point in a vibration mode, which reduces the control performance of the autofocus mechanism. Moreover, by increasing the sizes of the lens assembly and other elements to improve the quality, a weight of the lens assembly also increases, which may cause the lens assembly to tilt, and is not conducive to miniaturization of the electronic device.

Therefore, it is necessary to provide a shooting apparatus, a camera, and an electronic device to solve the foregoing problems.

SUMMARY

The present disclosure provides a shooting apparatus, a camera, and an electronic device, aiming to solve problems in the related art that an autofocus mechanism with a leaf spring has disadvantages of easy damage, large size, high weight, and low focusing performance.

In order to solve the foregoing problems, the present disclosure provides a shooting apparatus, including an autofocus mechanism and a lens assembly with an optical axis. The autofocus mechanism includes a first base with a receiving space, a support frame disposed in the receiving space and configured to fix the lens assembly, a ball disposed between the support frame and the first base, and a focusing drive component configured to drive the lens assembly to move along a direction of the optical axis and including a focusing coil and a focusing magnet. The autofocus mechanism further includes a first axial guide mechanism and a second axial guide mechanism disposed at intervals. The first axial guide mechanism includes a first receiving groove disposed on an outer side of the support frame, a first limiting groove disposed on an inner side of the first base, and a first ball disposed between the first receiving groove and the first limiting groove. The second axial guide mechanism includes a second receiving groove disposed on the outer side of the support frame, a second limiting groove disposed on the inner side of the first base, and a second ball disposed between the second receiving groove and the second limiting groove. The first receiving groove comprises a first receiving surface and a second receiving surface, a direction extending from the first receiving groove along a center line of an angle between the first receiving surface and the second receiving surface away from the lens assembly is a first direction; the second limiting groove comprises a second sliding surface and a third sliding surface, a direction extending from the second receiving groove along a center line of an angle between the second sliding surface and the third sliding surface away from the lens assembly is a second direction. The autofocus mechanism further includes a plurality of fixing magnetic yokes. The plurality of fixing magnetic yokes and the focusing magnets attract each other, to apply a force to the first ball along the first direction, and apply a force to the second ball along the second direction.

In some embodiments, the first receiving groove and the second receiving groove are disposed on two sides of the optical axis along the first direction.

In some embodiments, the first receiving groove and the second receiving groove are V-shaped grooves.

In some embodiments, on a cross section perpendicular to the optical axis, the second receiving groove includes a first sliding surface perpendicular to the second direction, and the second limiting groove includes a second sliding surface parallel to the first direction and a third sliding surface perpendicular to the first direction.

In some embodiments, the first ball is one of two first balls, and the two first balls are disposed sequentially along a direction parallel to the optical axis.

In some embodiments, the second ball is one of two second balls, and the two second balls are disposed sequentially along a direction parallel to the optical axis.

In some embodiments, the plurality of the magnetic yokes include three fixing magnetic yokes, and the three fixing magnetic yokes are disposed opposite to the focusing magnets along a radius direction of the lens assembly.

In some embodiments, the focusing magnets are disposed on the first base, and the focusing coils are disposed on the support frame.

In some embodiments, the focusing drive component is a voice coil motor.

In some embodiments, the shooting apparatus further includes an anti-shake mechanism. The anti-shake mechanism is configured to drive the autofocus mechanism to achieve anti-shake.

In some embodiments, the shooting apparatus further includes a telescopic focusing mechanism.

In some embodiments, the shooting apparatus further includes a periscope optical mechanism.

The present disclosure further provides a camera, including a camera body and the foregoing shooting apparatus.

The present disclosure further provides an electronic device, including a device body and the foregoing camera.

The present disclosure has the following beneficial effects.

According to the present disclosure, the support frame configured to fix the lens assembly is disposed in the first base with the receiving space, and the balls are disposed between the support frame and the first base. The focusing magnets are disposed on the first base, and the focusing coils and the fixing magnetic yokes are disposed on the support frame configured to fix the lens assembly. The focusing magnets and the fixing magnetic yokes attract each other, to fix the support frame to the first base, thereby fixing the lens assembly. The first receiving groove is defined on the outer side of the support frame, and the first limiting groove is defined on the side wall of the first base facing the support frame. The first ball is disposed between the first receiving groove and the first limiting groove. The first receiving groove, the first limiting groove and the first ball form the first axial guide mechanism. In addition, the second receiving groove is defined on the outer side of the support frame, and the second limiting groove is defined on the side wall of the first base facing the support frame. The second ball is disposed between the second receiving groove and the second limiting groove. The second receiving groove, the second limiting groove and the second ball form the second axial guide mechanism. The first axial guide mechanism and the second axial guide mechanism are configured to allow the support frame to move along the axial direction. Further, the plurality of fixing magnetic yokes are disposed in the shooting apparatus. The fixing magnetic yokes and the focusing magnets attract each other, to apply a force to the first ball along the first direction, and apply a force to the second ball along the second direction. The first direction and the second direction are neither in the same direction nor in opposite directions. During focus adjustment, the focusing coils are energized. The focusing coils move along the extension direction of the first axial guide mechanism and the second axial guide mechanism under the action of the magnetic forces of the focusing magnets, thereby achieving focusing. Therefore, the shooting apparatus can realize focusing and fix the lens assembly without using the leaf spring. This prevents the autofocus mechanism from malfunction caused by easy damage of the leaf spring, and reduces the size and weight of the shooting apparatus, thereby improving the performance of the autofocus mechanism.

BRIEF DESCRIPTION OF THE DRAWINGS

One or more embodiments are exemplified by the accompanying drawings, which do not constitute a limitation of the embodiments. Elements with the same reference numerals in the drawings are represented as similar elements. Unless otherwise stated, and the drawings are not intended to constitute a scale limitation.

REFERENCE NUMERALS

Figure 1:
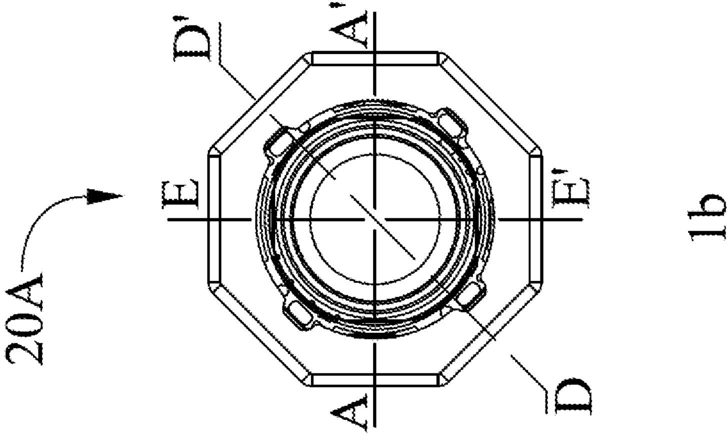
FIG. 1*a* is a three-dimensional schematic diagram of a shooting apparatus according to a first embodiment of the present disclosure.
FIG. 1*b* is a schematic diagram of a front view of the shooting apparatus according to the first embodiment of the present disclosure.
Figure 1:
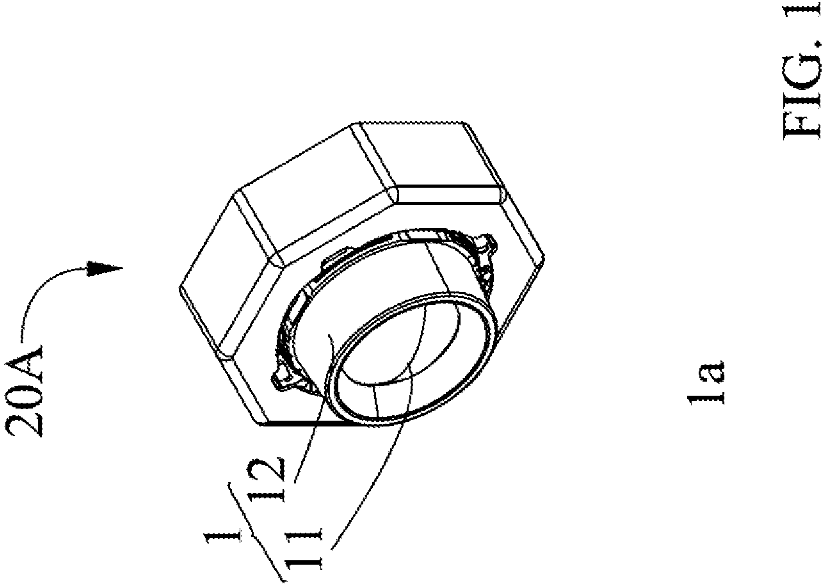
Figure 2:
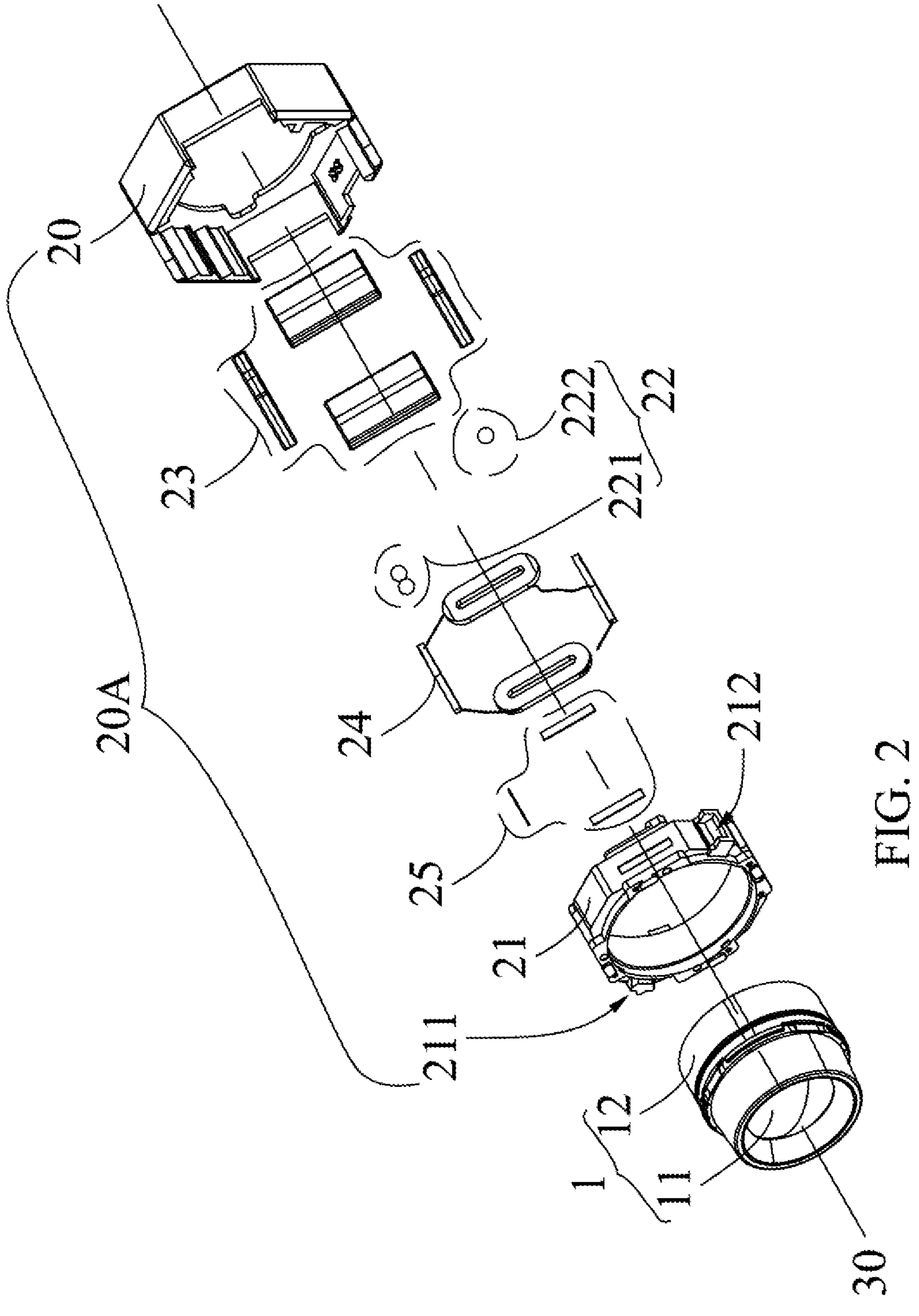
FIG. 2 is an exploded structural schematic diagram of an autofocus mechanism of the shooting apparatus according to the first embodiment of the present disclosure.
Figure 3:
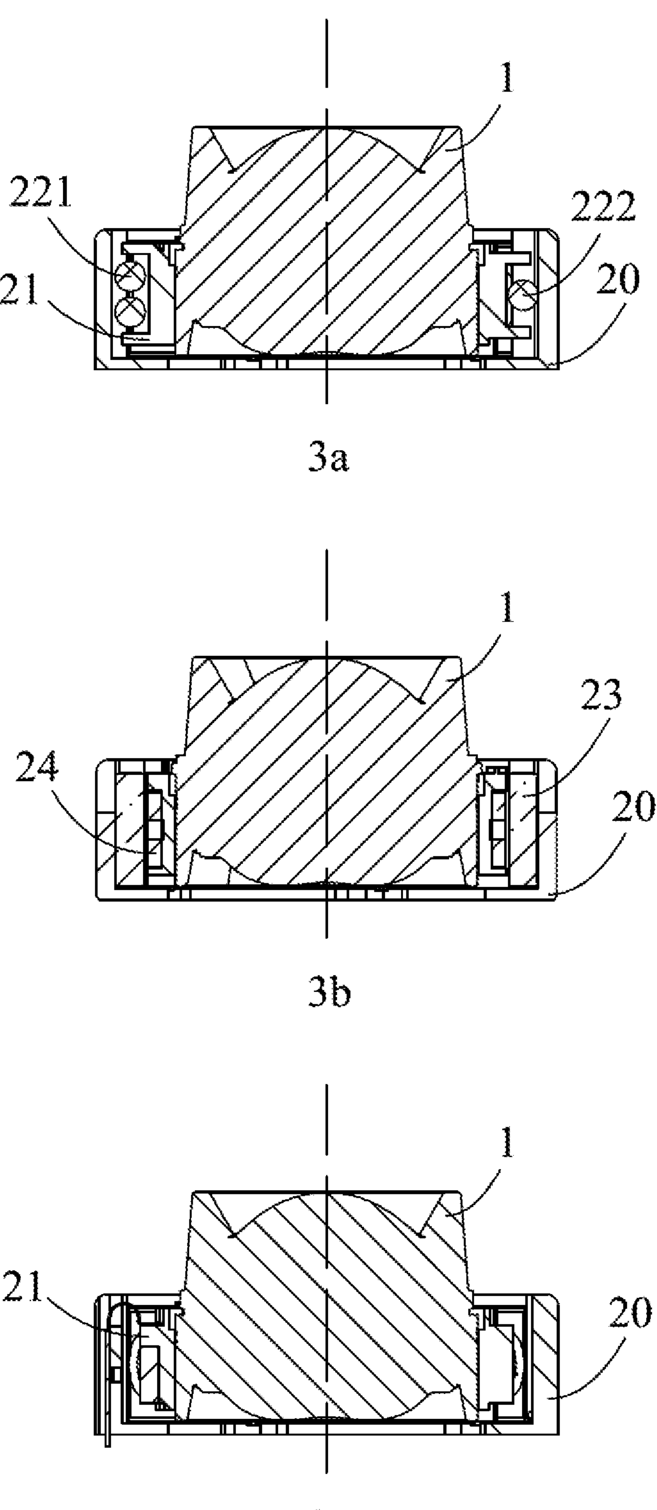
FIG. 3*a* is a cross-sectional schematic diagram of FIG. 1*b* along the line A-A'.
FIG. 3*b* is a cross-sectional schematic diagram of FIG. 1*b* along the line D-D'.
FIG. 3*c* is a cross-sectional schematic diagram of FIG. 1*b* along the line E-E'.
Figure 4:
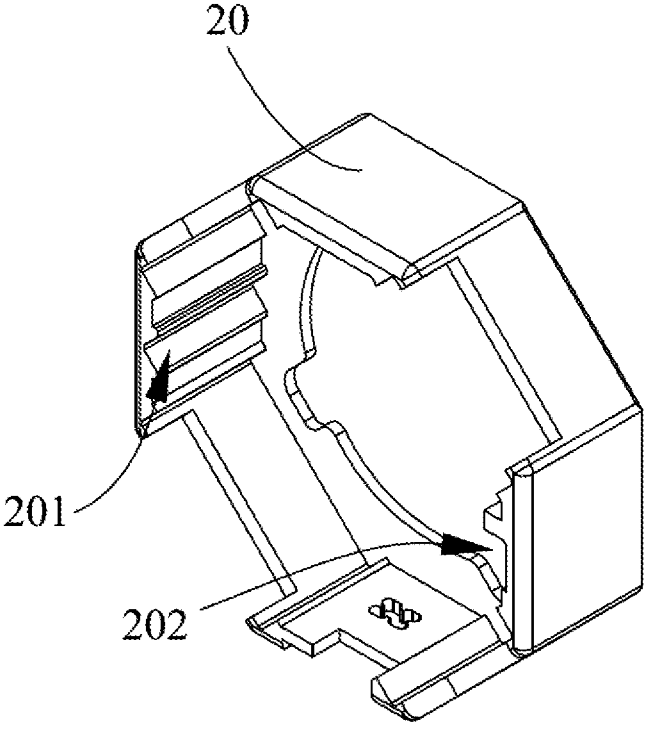
FIG. 4 is a structural schematic diagram of a first base of the shooting apparatus according to the first embodiment of the present disclosure.
Figure 5:
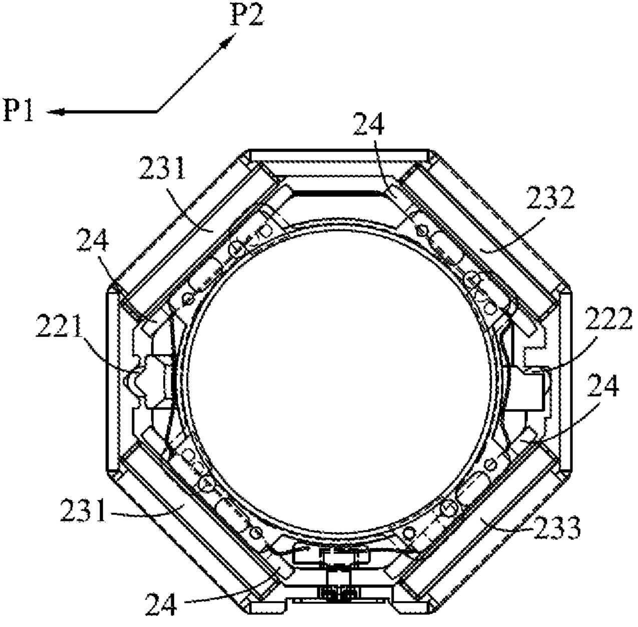
FIG. 5 is a schematic diagram illustrating distribution of focusing magnets and focusing coils of the shooting apparatus according to the first embodiment of the present disclosure.

1 lens assembly
11 lens
12 barrel
20A autofocus mechanism
20 first base
201 first limiting groove
2011 first limiting surface
2012 second limiting surface
202 second limiting groove
21 support frame
211 first receiving groove
2111 first receiving surface
2112 second receiving surface
212 second receiving groove
2121 first sliding surface
2122 second sliding surface
2123 third sliding surface
22 ball
221 first ball
222 second ball
23 focusing magnet

231 first magnet
232 second magnet
233 third magnet
24 focusing coil
25 fixing magnetic yoke
251 first magnetic yoke
252 second magnetic yoke
26 position detection magnet
27 first flexible printed board
271 bending portion
272 main body portion
28 first position detection element
29 housing
30 optical axis
40A anti-shake mechanism
41 front base
411 anti-shake magnetic yoke
412 second flexible printed board
413 anti-shake coil
414 first anti-shake groove
415 first support plate
42 rear base
421 third flexible printed board
422 second position detection element
43 moving frame
431 anti-shake magnet
432 second anti-shake groove
433 second support plate
44 anti-shake support component
45 block portion
46 outer housing
100 shooting apparatus
300 periscope optical mechanism
400 camera
410 camera body
50 device body

DETAILED DESCRIPTION OF THE EMBODIMENTS

In order to clarify the purpose, technical solution, and advantages of the embodiments of the present disclosure, the following will provide a detailed explanation of each embodiment of the present disclosure in conjunction with the accompanying drawings. It would be note that many technical details have been described in the embodiments of the present disclosure, to allow readers to better understand the present disclosure. However, even without these technical details and various changes and modifications based on the following embodiments, the technical solution required for protection in the present disclosure can still be realized.

In the embodiments of the present disclosure, the terms “up”, “down”, “left”, “right”, “front”, “rear”, “top”, “bottom”, “inside”, “outside”, “center”, “vertical”, “horizontal”, “lateral”, “longitudinal”, and the like, indicate orientations or positional relationships based on the orientation or positional relationships shown in the accompanying drawings. These terms are intended to better describe the present disclosure and the embodiments, and are not intended to limit that the indicated apparatus, element, or component must have or be constructed and operated in a particular orientation.

In addition to being used to represent the orientations or the positional relationships, some of the terms may be used to represent other meanings. For example, the term “on” may be used to represent a certain attachment or connection relationship in a certain situation. Those skilled in the art can understand the specific meanings of these terms in the present disclosure based on the specific situation.

In addition, the terms “install”, “arrange”, “dispose”, “define”, “connect”, and “communicate” should be understood broadly. For example, it may be a fixed connection, a detachable connection, or an integral construction; or it may be a mechanical connection or an electrical connection; or it may be a direct connection, an indirect connection through an intermediate medium, or a communication between interiors of two apparatuses, components, or components. Those skilled in the art can understand the specific meanings of these terms in the present disclosure based on the specific situation.

In addition, the terms “first”, “second”, and the like are mainly used to distinguish different apparatuses, elements, or components (specific types and constructions may be the same or different), and are not intended to indicate or imply the relative importance and quantity of the indicated apparatuses, elements, or components. Unless otherwise specified, “a plurality of” means two or more.

The shooting apparatus, the camera, and the electronic device provided by the present disclosure are described in detail below. The following content is merely for the convenience of understanding the implementation details and is not necessary for implementing the present disclosure.

A first embodiment of the present disclosure provides a shooting apparatus, as shown in FIG. 1 to FIG. 5, which includes an autofocus mechanism 20A and a lens assembly 1 with an optical axis 30. The autofocus mechanism 20A includes a first base 20 with a receiving space, a support frame 21 disposed in the receiving space and configured to fix the lens assembly 1, balls 22 disposed between the support frame 21 and the first base 20, and a focusing drive component configured to drive the lens assembly 1 to move along a direction of the optical axis 30 and including focusing magnets 23 and focusing coils 24. The autofocus mechanism 20A further includes a first axial guide mechanism and a second axial guide mechanism disposed at intervals. The first axial guide mechanism includes a first receiving groove 211 defined on the outer side of the support frame 21, a first limiting groove 201 defined on the inner side of the first base 20, and a first ball 221 disposed between the first receiving groove 211 and the first limiting groove 201. The second axial guide mechanism includes a second receiving groove 212 defined on the outer side of the support frame 21, a second limiting groove 202 defined on the inner side of the first base 20, and a second ball 222 disposed between the second receiving groove 212 and the second limiting groove 202. The autofocus mechanism 20A further includes a plurality of fixing magnetic yokes 25. The fixing magnetic yokes 25 attract the focusing magnets 23, so as to apply a force to the first ball 221 along a first direction P1 and a force to the second ball 222 along a second direction P2. The first direction P1 and the second direction P2 are neither in the same direction nor in opposite directions.

Compared to the related art, according to the present disclosure, the focusing magnets 23 are disposed on the first base 20, the lens assembly 1 is fixed to the support frame 21, and the fixing magnetic yokes 25 are disposed on the support frame 21. The lens assembly 1 is fixed to the support frame 21 by the forces of attraction between the focusing magnets 23 and the fixing magnetic yokes 25. In addition, the focusing coils 24 are disposed on the support frame 21. When the focusing coils 24 are energized, the support frame 21 moves along the direction of the optical axial using the principle that an energized coil is subjected to a force in a magnetic field, thereby realizing focusing of the lens assembly 1. In this way, the shooting apparatus can realize focusing and fix the lens assembly 1 without using the leaf spring. This prevents the autofocus mechanism from malfunction caused by easy damage of the leaf spring, and reduces the size and weight of the shooting apparatus, thereby improving the performance of the autofocus mechanism.

Specifically, the lens assembly 1 includes a lens 11 and a cylindrical hollow barrel 12. The lens 11 is disposed inside the barrel 12. The outer wall of the barrel 12 is fixedly connected to the inner wall of support frame 21. The barrel 12 provides protection for the lens 11, thereby avoiding the lens from being damaged.

Optionally, the focusing drive component is a voice coil motor or any other motor, as long as it can drive the lens assembly 1 to achieve focusing. The barrel 12 and the support frame 21 may be connected by bonding, snap-fitting, welding, or other means, as long as the barrel 12 is firmly connected to the support frame 21 and the autofocus mechanism 20A is allowed to operate normally. There is no limit in the embodiments of the present disclosure.

It will be appreciated that the first axial guide mechanism and the second axial guide mechanism may be guide rails or may have other structures, as long as they allow the support frame 21 to move in the direction parallel to the optical axis 30 under external forces. There is no limit in the embodiments of the present disclosure.

Figure 6:
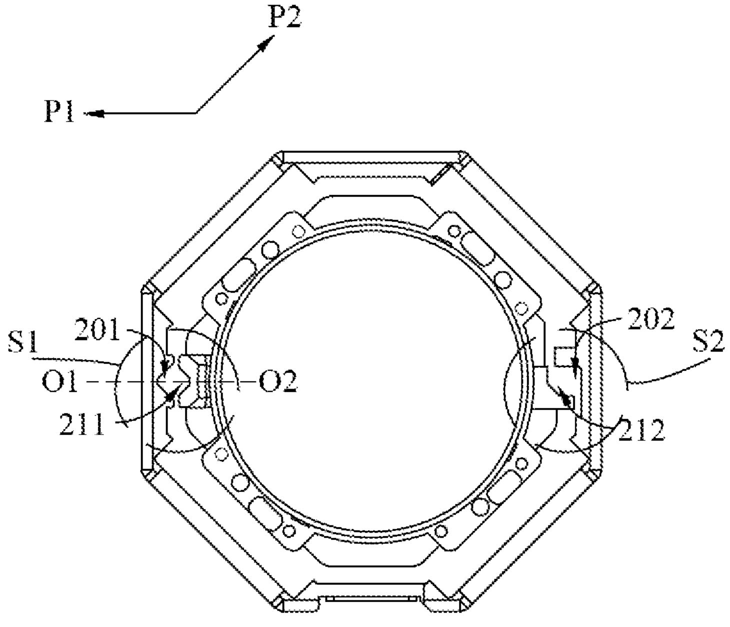
FIG. 6 is a schematic diagram illustrating distribution of limiting grooves and receiving grooves of the shooting apparatus according to the first embodiment of the present disclosure.

Referring to FIG. 6, in some embodiments, the first receiving groove 211 and the second receiving groove 212 are defined on two sides of the optical axis along the first direction P1. In this way, when the support frame 21 moves along the direction of the optical axis 30 under the magnetic forces of the focusing magnets 23, the first receiving groove 211 and the second receiving groove 212 that are disposed symmetrically with each other make the support frame 21 under balanced forces, so that the support frame 21 can move more stable, thereby improving the shooting effect of the shooting apparatus.

Further, the first receiving groove 211, the first limiting groove 201, the second receiving groove 212, and the second limiting groove 202 all extend along the direction of the optical axis, so that the first ball 221 and the second ball 222 are constrained to move along the direction of the optical axis, thereby allowing the support frame 21 to move along the direction of the optical axis.

In some embodiments, the first receiving groove 211 and the first limiting groove 201 are both V-shaped grooves. In this way, when the first ball 221 is located between the first receiving groove 211 and the first limiting groove 201, the first ball 221 abuts against the side walls of the first receiving groove 211 and the first limiting groove 201, which prevents the support frame 21 from driving the lens assembly 1 to rotate around the optical axis 30, thereby ensuring the stability of the lens assembly 1.

Figure 17:
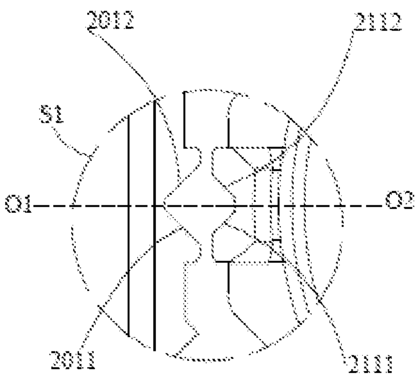
FIG. 17 is a structural schematic diagram of a first limiting groove and a first receiving groove of the shooting apparatus according to a first embodiment of the present disclosure.

Referring to FIG. 17, specifically, the first receiving groove 211 includes a first receiving surface 2111 and a second receiving surface 2112, and the angle between the first receiving surface 2111 and the second receiving surface 2112 is about 90°, and the first limiting groove 201 includes a first limiting surface 2011 and a second limiting surface 2012, and the angle between the first limiting surface 2011 and the second limiting surface 2012 is about 90°. The first receiving groove 211 and the first limiting groove 201 are designed as right-angle recesses, so that the processing difficulty can be reduced. Moreover, the centerline of the angle of the first receiving surface 2111 and the second receiving surface 2112 is along the direction of O1O2 and coincides with the direction of the centerline of the angle of the first limiting surface 2011 and the second limiting surface 2012, and the first direction P1 is the direction extending from the first receiving groove 211 along the centerline O1O2 toward the direction away from the lens assembly 1.

There are a plurality of first balls 221, and the plurality of first balls 221 are arranged sequentially along a direction parallel to the optical axis 30. The plurality of first balls 221 arranged sequentially provide a plurality of support points, which can prevent the support frame 21 from flipping along a straight line perpendicular to the optical axis 30.

Exemplarily, there are two first balls 221. In this case, the two first balls 221 provide two support points, which can achieve the constraint and thereby preventing the rotation of the support frame 21. In addition, by using only two first balls 221, the quantity of the first balls 221 is reduced, thereby reducing the manufacturing cost of the shooting apparatus.

Optionally, there may be three, four or more first balls 221, and there may be three, four or more second balls 222, as long as they can prevent the support frame 21 from rotating and flipping. There is no limit in the embodiments of the present disclosure.

Specifically, in the case that there are two first balls 221, there is one second ball 222. Since the two first balls 221 can prevent the support frame 21 from flipping, only one second ball 222 is required to ensure the stability of the support frame 21. This reduces the quantity of the second ball 222, thereby reducing the manufacturing cost of the shooting apparatus.

In some embodiments, the focusing magnets 23 are disposed on the first base 20, and the focusing coils 24 are disposed on the support frame 21. The fixing magnetic yokes 25 are disposed on the support frame 21, and located between the focusing coils 24 and the support frame 21. In this way, when the focusing magnets 23 attract the fixing magnetic yokes 25, the support frame 21 is attracted and fixed to the first base 20.

Figure 7:
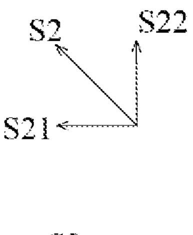
FIG. 7 is a schematic diagram illustrating distribution of fixing magnetic yokes of the shooting apparatus according to the first embodiment of the present disclosure.
Figure 7:
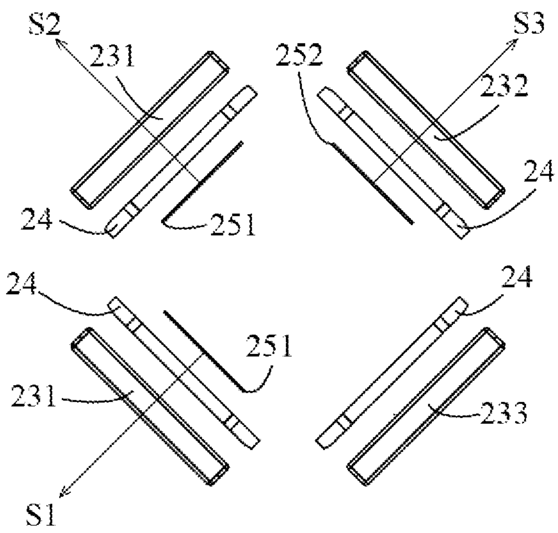

Referring to FIG. 7, further, there are four focusing magnets 23 and three fixing magnetic yokes 25. Each fixing magnetic yoke 25 is disposed opposite to the corresponding focusing magnet 23 along a radius direction of the lens assembly 1, where the three fixing magnetic yokes 25 are in one-to-one correspondence with any three of the four focusing magnets 23. This ensures that the direction and magnitude of a resultant force acting on the support frame 21 are stable, thereby making the lens assembly 1 relatively stable during the focusing process.

Referring to FIG. 7, specifically, the focusing magnets 23 includes two first magnets 231, a second magnet 232 and a third magnet 233, the fixing magnetic yokes 25 includes two first yokes 251 and a second yoke 252, wherein the first magnet 231, the second magnet 232 and the third magnet 233 have the same specifications, the first yoke 251 and the second yoke 252 have the same specifications, the two first magnets 231 correspond to the two first yokes 251, the two first magnets 231 attract the two first yokes 251 in the S1 direction and the S2 direction respectively, and the second magnet 232 attracts the second yoke 252 in the S3 direction, forming three magnetic springs. Since the S1 direction and S3 direction reverse each other and have the same magnetic force, they actually cancel each other, so that the combined force of attraction between the yoke and the magnet is the force along the S2 direction, as shown in FIG. 7, located in the second quadrant. Since the fixing magnetic yokes 25 are fixed to the support frame 21 and the focusing magnets 23 are set to the first base 20, the force along the S2 direction grips the first ball 221 and the second ball 222 between the support frame 21 and the first base 20. The function of setting 3 magnetic springs includes at least two, one is to form a combined force along the S2 direction with certainty, so that the ball will not disengage when the support frame 21 moves in the optical axis direction and the support frame will not shake; the other is to prevent magnetic leakage, and the focusing coils 24 are set between the focusing magnets 23 and the fixing magnetic yokes 25, which can enhance the magnetic flux and effectively ensure the magnetic driving force in the AF direction.

Further, the first magnets 231, the second magnet 232, and the third magnet 233 are disposed at intervals. There are four focusing coils 24. The four focusing magnets 23 are disposed at intervals, and are in one-to-one correspondence with the four focusing coils 24. In this way, when the focusing coils 24 are energized, the magnetic forces acting on the support frame 21 along the optical axis 30 have balanced distribution, thereby making the support frame 21 more stable when moving along the direction of the optical axis 30.

In some embodiments, the fixing magnetic yokes 25 are located in the middle of a maximum distance that the support frame 21 moves under the action of the magnetic forces, which ensures that the interaction of magnetic field between the fixing magnetic yokes 25 and the focusing magnets 23 has the highest efficiency and maximum range.

It will be appreciated that when the support frame 21 is subjected to the forces of the first magnets 231 and the second magnet 232, the support frame 21 also applies forces to the first ball 221 and the second ball 222. In this case, the force applied on the first ball 221 from the side wall of the first receiving groove 211 is along the first direction P1, and the force applied on the second ball 222 from the side wall of the second receiving groove 212 is along the second direction P2.

Figure 8:
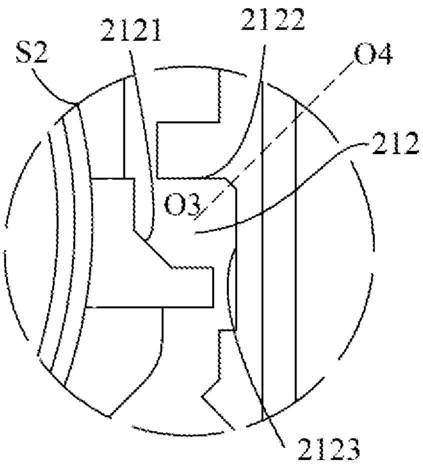
FIG. 8 is a structural schematic diagram of a second limiting groove and a second receiving groove of the shooting apparatus according to a first embodiment of the present disclosure.

Referring to FIG. 8, specifically, on a cross section perpendicular to the optical axis 30, the second receiving groove 212 includes a first sliding surface 2121 perpendicular to the second direction P2; and the second limiting groove 202 includes a second sliding surface 2122 parallel to the first direction P1 and a third sliding surface 2123 perpendicular to the first direction P1. The centerline of the angle between the second sliding surface 2122 and the third sliding surface 2123 is along the direction of O3O4, the first sliding surface 2121 is perpendicular to the direction of O3O4, and the second direction P2 is the direction extending from the second receiving groove 212 along the centerline O3O4 toward the direction away from the lens assembly 1. In this way, the first sliding surface 2121 abuts against the second ball 222, to apply the force to the second ball 222 along the second direction P2. The second sliding surface 2122 and the third sliding surface 2123 abut against the second ball 222, to constrain a range of motion of the second ball 222, which allows the second ball 222 to move along the direction of the optical axis 30 and thereby preventing dropping.

Referring together to FIGS. 6-8 and FIG. 17, the force along the direction S2 has a left component force S21 and an upper component force S22, with the left component force S21 translating into a force to grip the first ball 221 along the first direction P1 and the upper component force S22 translating into a force to grip the second ball 222 along the second direction P2.

Figure 9:
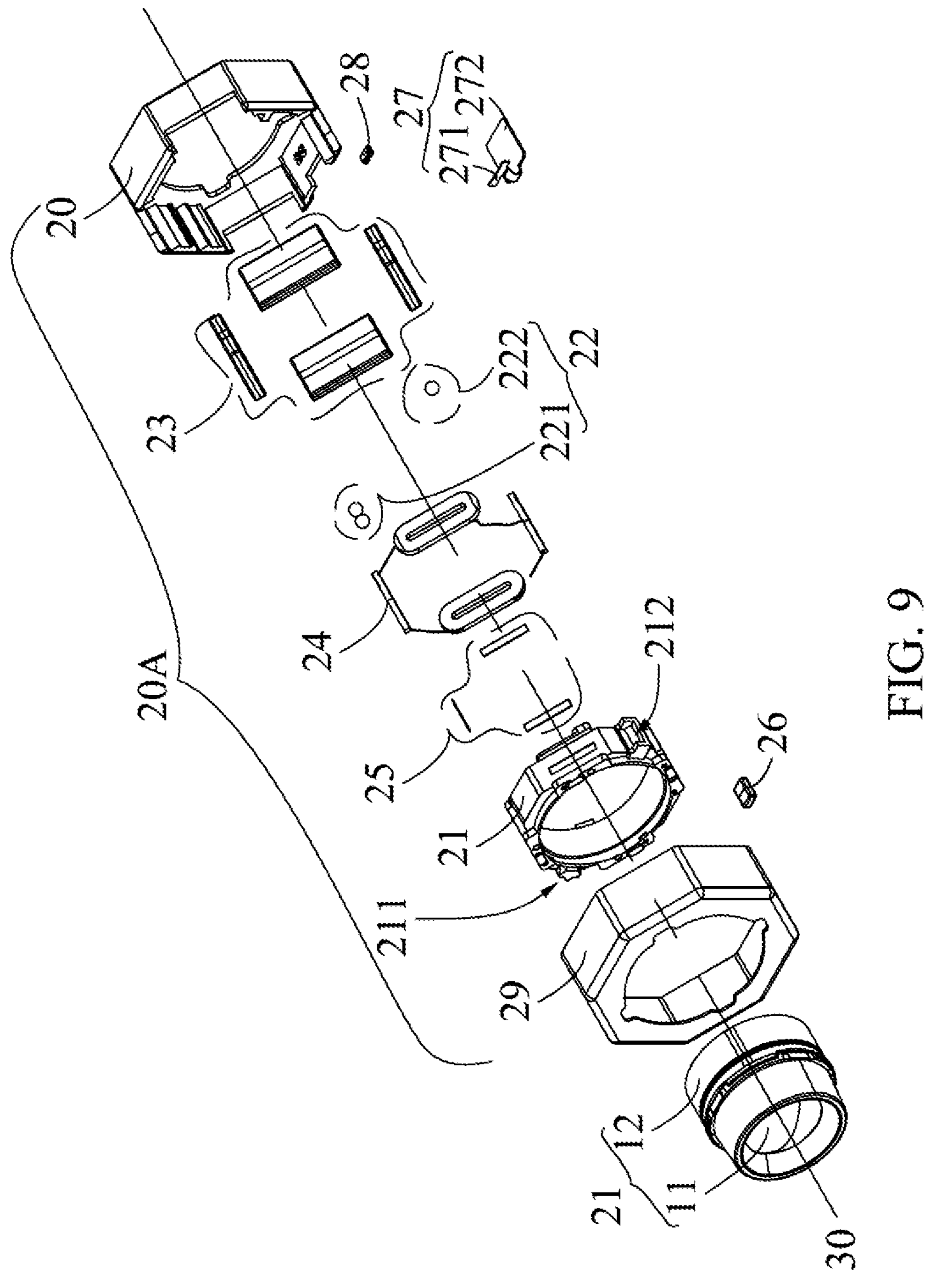
FIG. 9 is a structural schematic diagram of a position detection structure and a housing of the shooting apparatus according to a first embodiment of the present disclosure.

Referring to FIG. 9, in some embodiments, the autofocus mechanism 20A further includes a position detection magnet 26, a first flexible printed board 27, and a first position detection element 28. The first flexible printed board 27 includes a bending portion 271 and a main body portion 272. The position detection magnet 26 is fixed to the side wall of the support frame 21. The bending portion 271 is attached to the side wall of the support frame 21, and is electrically connected to all the focusing coils 24. The main body portion 272 is connected to the bending portion 271, and is disposed opposite to the position detection magnet 26. A through hole is defined in the first base 20. The first position detection element 28 is disposed in the through hole and electrically connected to the main body portion 272 of the first flexible printed board 27. When the shooting apparatus focuses, the first position detection element 28 detects a change in a magnetic flux of the position detection magnet 26 in motion, to determine a specific position of the support frame 21, thereby accurately controlling the focusing accuracy.

In some embodiments, the autofocus mechanism 20A further includes a housing 29. The housing 29 is a circular groove with two opposite openings. The bottom wall of the first base 20 is located at one of the openings, and forms an accommodation space together with the housing 29. The first base 20 and the other components disposed on the first base 20, as well as the support frame 21 and the other components disposed on the support frame 21 are all located within the accommodation space. The lens assembly 1 extends out of the accommodation space through the other opening. The housing 29 surrounds the other elements of the autofocus mechanism 20A, to provide protection.

Figure 10:
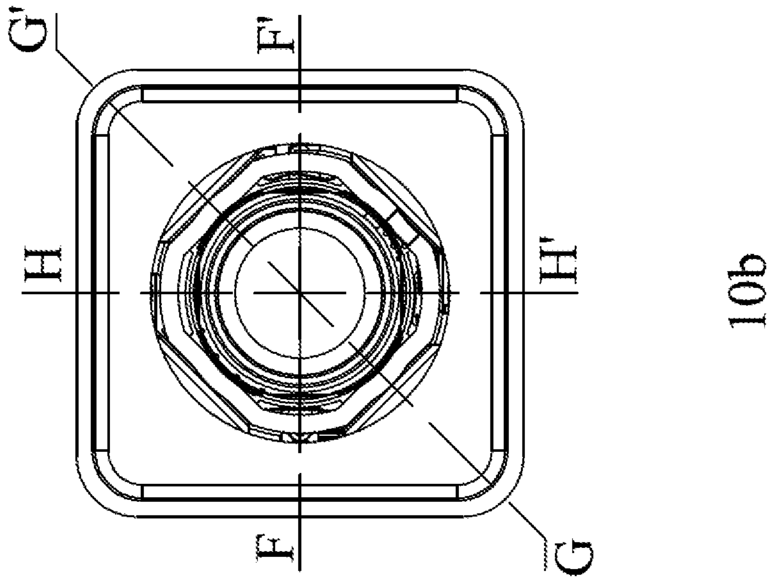
FIG. 10*a* is a three-dimensional schematic diagram of a shooting apparatus with an anti-shake mechanism according to a second embodiment of the present disclosure.
FIG. 10*b* is a schematic diagram of a front view of the shooting apparatus with the anti-shake mechanism according to the second embodiment of the present disclosure.
Figure 10:
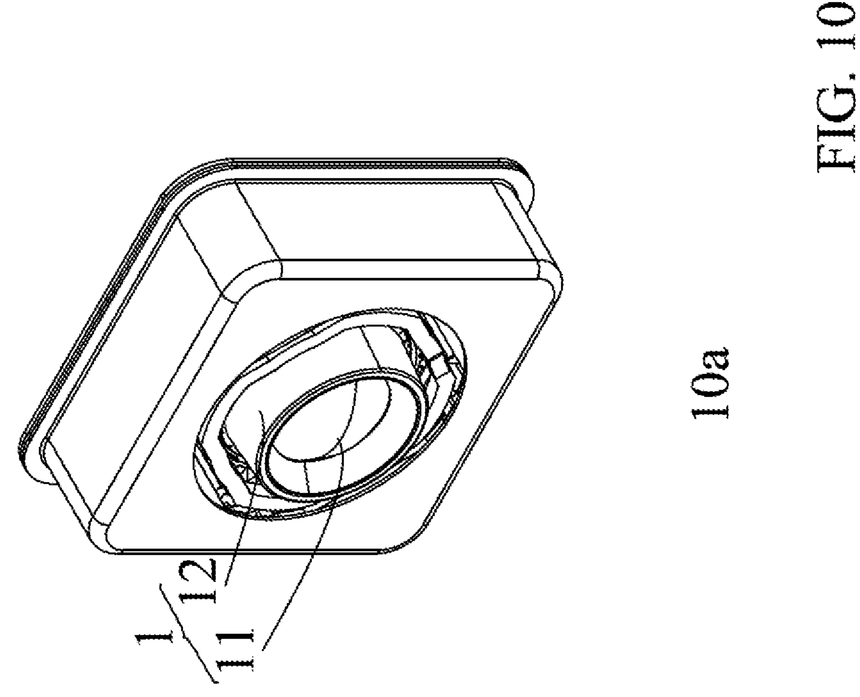
Figure 11:
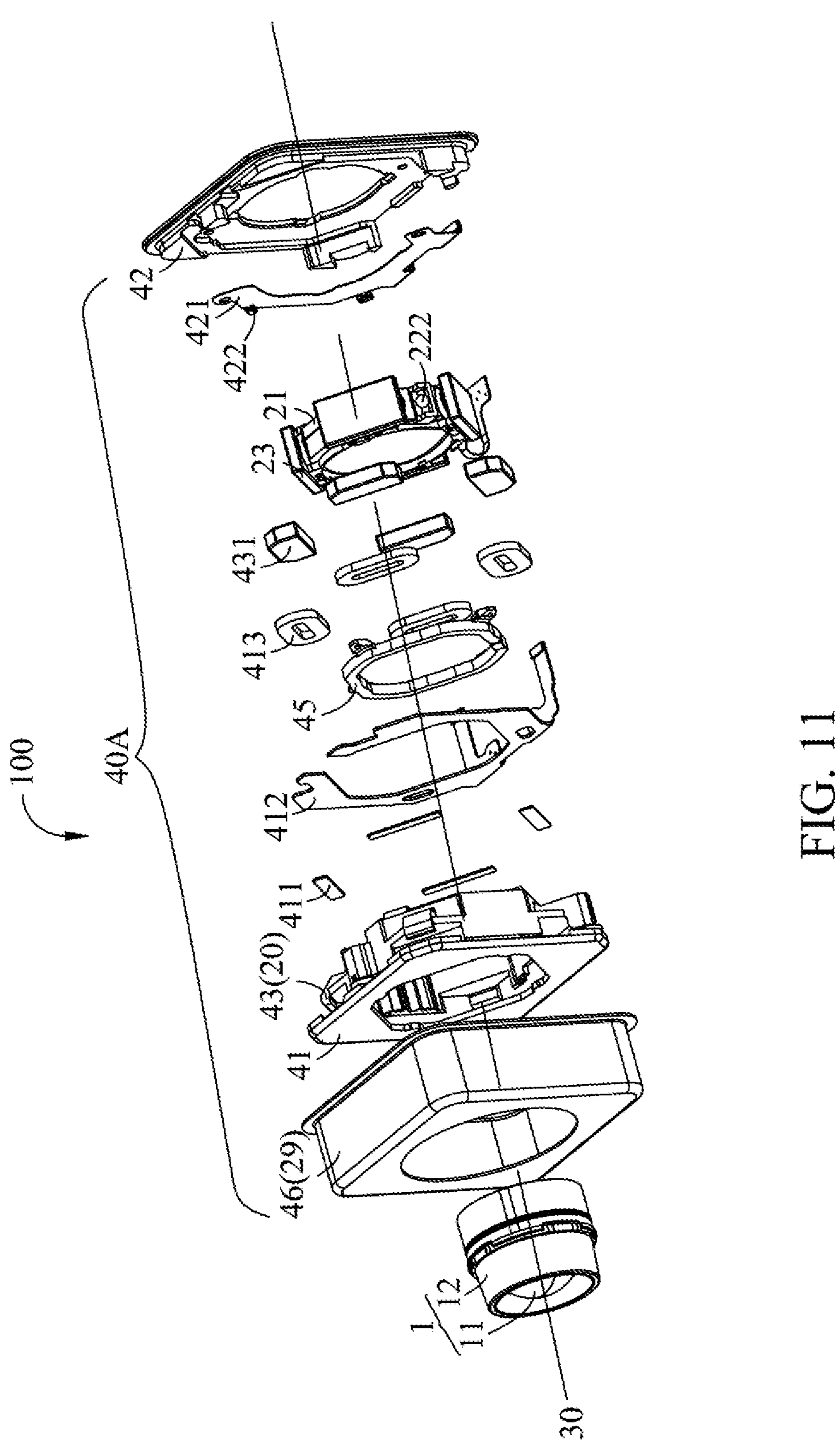
FIG. 11 is an exploded structural schematic diagram of the shooting apparatus with the anti-shake mechanism according to the second embodiment of the present disclosure.
Figure 12:
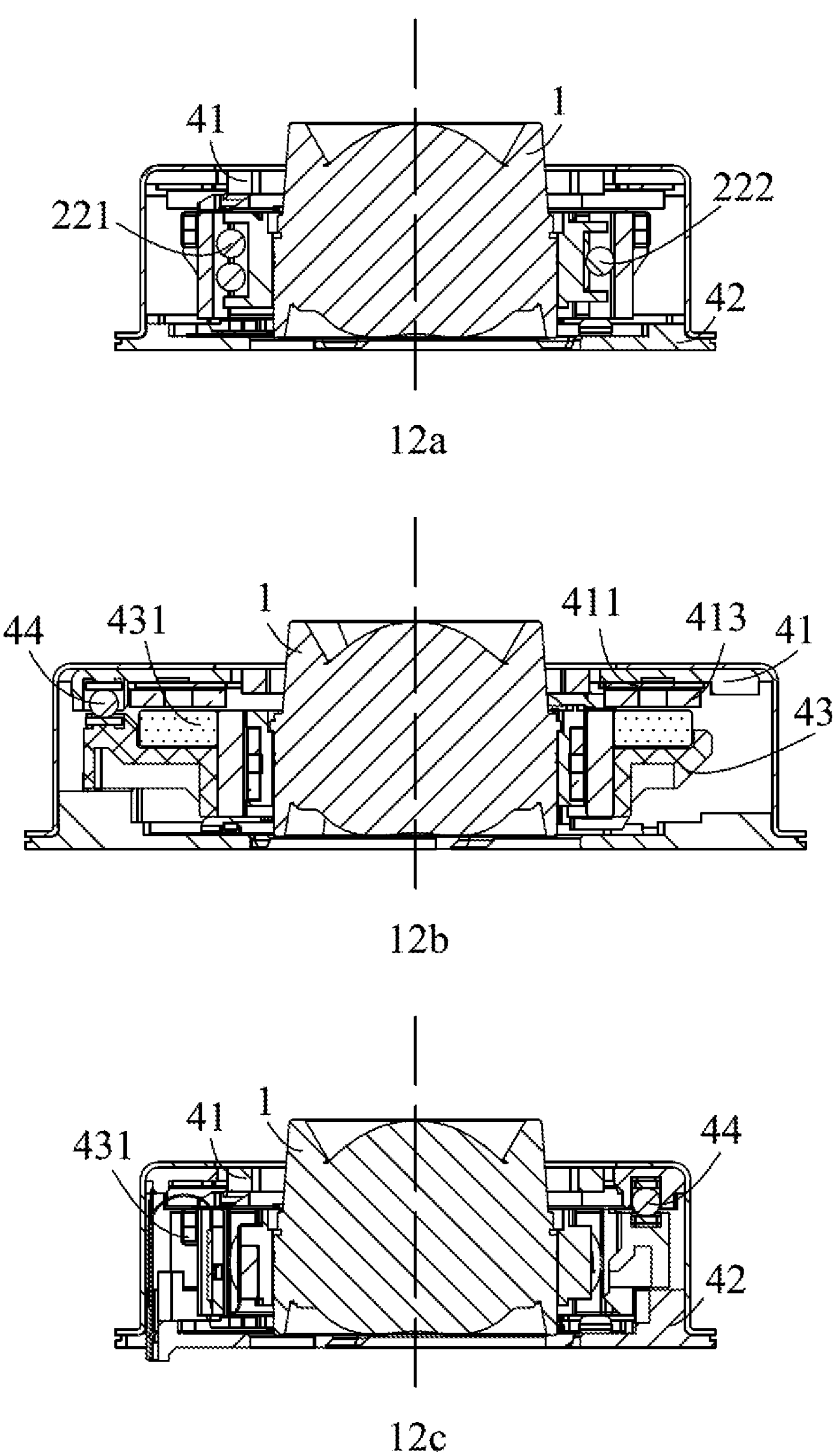
FIG. 12*a* is a cross-sectional schematic diagram of FIG. 10*b* taken along F-F'.
FIG. 12*b* is a cross-sectional schematic diagram of FIG. 10*b* taken along G-G'.
FIG. 12*c* is a cross-sectional schematic diagram of FIG. 10*b* taken along H-H'.

A second embodiment of the present disclosure provides a shooting apparatus, as shown in FIG. 10 to FIG. 12, which includes an anti-shake mechanism 40A, and the autofocus mechanism 20A of the foregoing first embodiment. The anti-shake mechanism 40A is configured to drive the autofocus mechanism 20A, so as to achieve anti-shake.

In some embodiments, the shooting apparatus 100 further includes the anti-shake mechanism 40A. The autofocus mechanism 20A is disposed on the anti-shake mechanism 40A, and the anti-shake mechanism 40A controls the autofocus mechanism 20A to move, so as to achieve anti-shake.

Specifically, the anti-shake mechanism 40A includes a front base 41 and a rear base 42 that are fixedly connected, a moving frame 43 sandwiched between the front base 41 and rear base 42, and an anti-shake support component 44. The moving frame 43 is the first base 20. Anti-shake magnetic yokes 411, a second flexible printed board 412, and anti-shake coils 413 are disposed in sequence on the side of the front base 41 facing the rear base 42. There are a plurality of anti-shake magnetic yokes 411 and a plurality of anti-shake coils 413. The plurality of anti-shake magnetic yokes 411 are in one-to-one correspondence with the plurality of anti-shake coils 413. A plurality of anti-shake magnets 431 are fixedly spaced on the moving frame 43. The plurality of anti-shake magnets 431 are in one-to-one correspondence with the plurality of anti-shake coils 413. By the forces of attraction between the anti-shake magnetic yokes 411 and the anti-shake magnets 431, the moving frame 43 is fixed to the front base 41.

Figure 13:
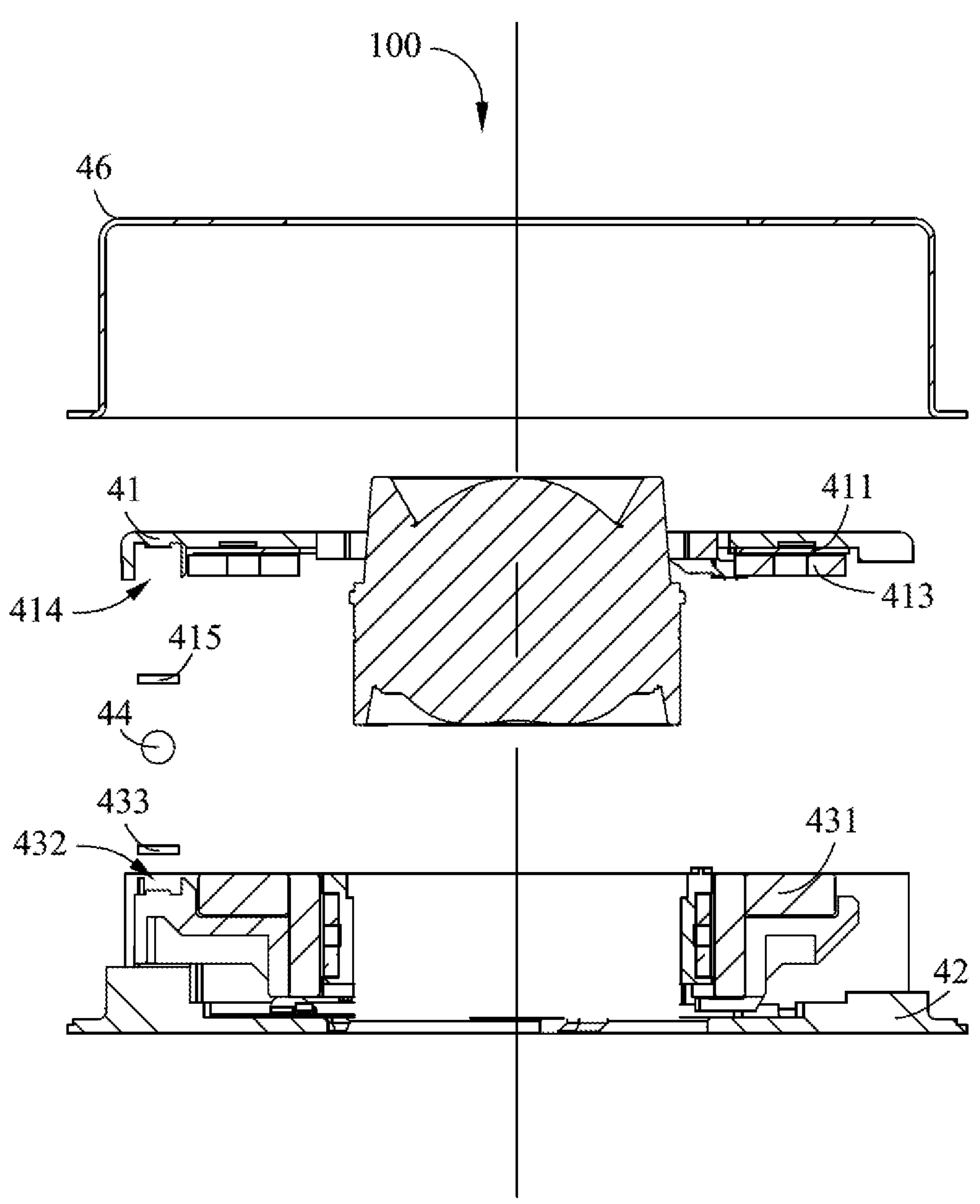
FIG. 13 is an exploded schematic diagram of FIG. 12*b*.

Referring to FIG. 13, further, a plurality of first anti-shake grooves 414 whose openings face the moving frame 43 are defined in the front base 41, and a plurality of second anti-shake grooves 432 whose openings face the front base 41 are defined in the moving frame 43. The first anti-shake groove 414 and the second anti-shake groove 432 form an accommodation space, and the anti-shake support component 44 is disposed in the accommodation space. The anti-shake support component 44 is able to translate within the accommodation space. When the anti-shake coils 413 are energized by the second flexible printed board 412, the anti-shake coils 413 move under the action of the magnetic forces of the anti-shake magnets 431, so as to drive the moving frame 43 to move. The movement direction of the moving frame 43 under the action of the anti-shake magnets 431 is perpendicular to the optical axis 30. By changing the currents flowing in different anti-shake coils 413 with the second flexible printed board 412, the moving frame 43 moves freely in a plane perpendicular to the optical axis 30, thereby achieving automatic anti-shake.

Further, a first support plate 415 is disposed in the first anti-shake groove 414, and a second support plate 433 is disposed in the second anti-shake groove 432. The anti-shake support component 44 is sandwiched between the first support plate 415 and the second support plate 433. The anti-shake support component 44 is a third ball.

Optionally, the first anti-shake groove 414 and the second anti-shake groove 432 are cylindrical grooves, whose diameters of the circular cross sections are greater than the diameter of the third ball. The first anti-shake groove 414 and the second anti-shake groove 432 may have other structures, as long as they can enable the anti-shake mechanism to work normally. There is no limit in the embodiments of the present disclosure.

Referring to FIG. 11, in some embodiments, the anti-shake mechanism 40A further includes a third flexible printed board 421 and a plurality of second position detection elements 422. The third flexible printed board 421 is fixedly disposed on the side of the rear base 42 facing the moving frame 43. The plurality of second position detection elements 422 are spaced on the side of the third flexible printed board 421 facing the moving frame 43. When the anti-shake mechanism 40A performs anti-shake compensation, the second position detection elements 422 are configured to detect a change in magnetic fluxes of the anti-shake magnets 431, so as to determine the position of the moving frame 43, thereby achieving high-precision anti-shake compensation.

In some embodiments, the anti-shake mechanism further includes a block portion 45. The block portion 45 is disposed between the front base 41 and the moving frame 43, to play a limiting role on the moving frame 43. This prevents the moving frame 43 from moving too much under the action of the drive mechanism and thereby causing damage to the shooting apparatus 100.

In some embodiments, the anti-shake mechanism 40A further includes an outer housing 46, which is the housing 29. The outer housing 46 is a circular groove with two opposite openings. The bottom wall of the rear base 42 is disposed at one of the openings, and forms an accommodation space together with the outer housing 46. The front base 41 and the other components disposed on the front base 41, as well as the anti-shake mechanism 40A and the other components disposed on the rear base 42 are all located in the accommodation space. The lens assembly 1 extends out of the accommodation space through the other opening. The outer housing 46 surrounds the autofocus mechanism 20A and the anti-shake mechanism 40A, to provide protection.

Figure 14:
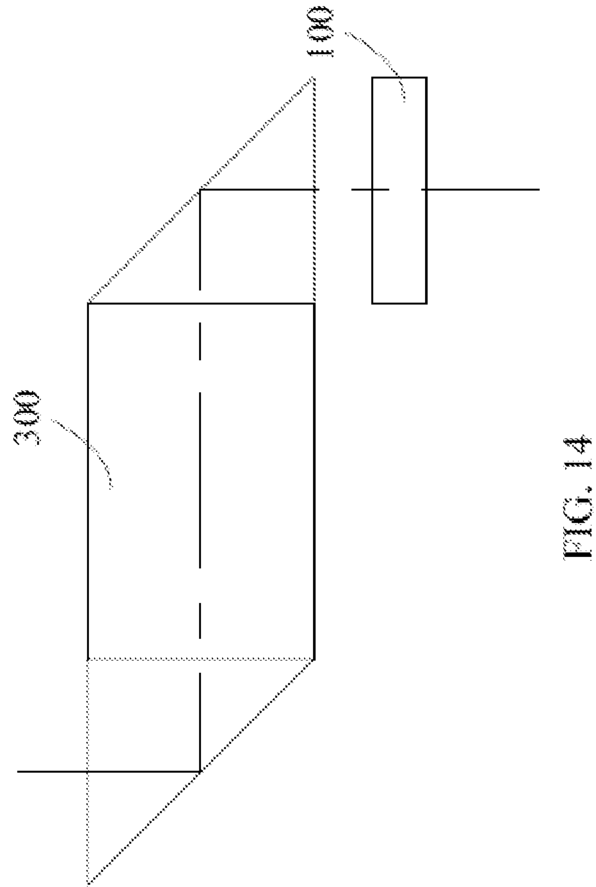
FIG. 14 is a schematic diagram of a shooting apparatus with a periscope optical mechanism according to a fourth embodiment of the present disclosure.

A third embodiment of the present disclosure provides an optical device, as shown in FIG. 14, which includes a periscope optical mechanism 300 and the shooting apparatus 100 of the second embodiment.

Compared to the prior art, according to the fourth embodiment of the present disclosure, the shooting apparatus 100 of the second embodiment is disposed on the periscope optical mechanism 300, thereby achieving lightweight design of the optical device.

Figure 15:
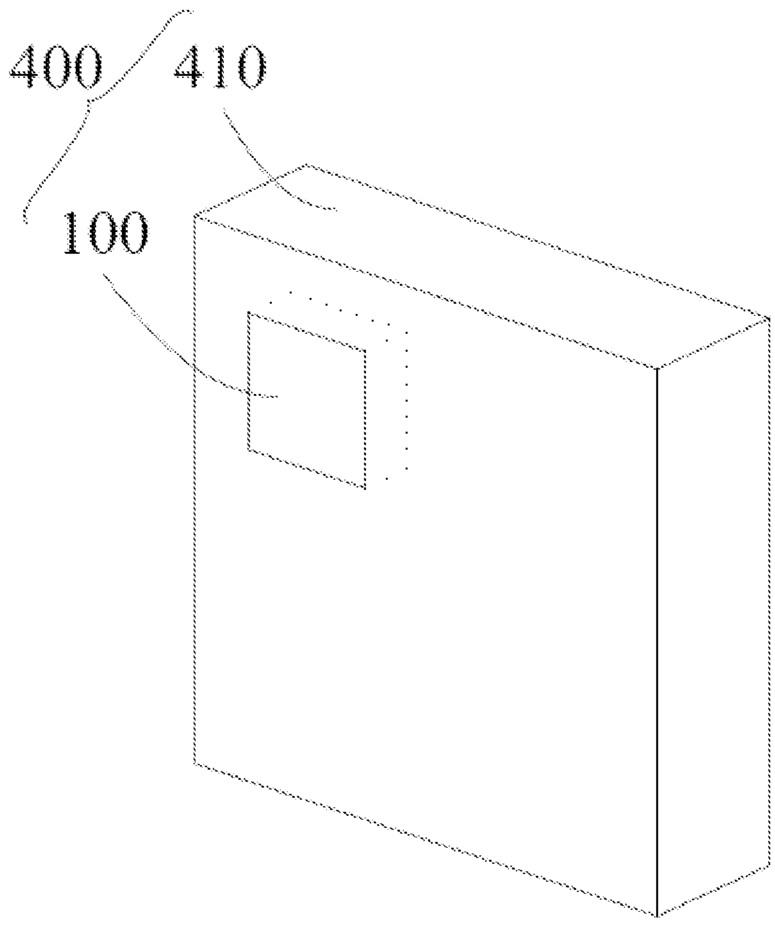
FIG. 15 is a three-dimensional schematic diagram of a camera according to a fifth embodiment of the present disclosure.

A fourth embodiment of the present disclosure provides a camera 400, as shown in FIG. 15, which includes a camera body 410 and the shooting apparatus 100.

Compared to the prior art, according to the fifth embodiment of the present disclosure, the shooting apparatus 100 is disposed in the camera body 410, which improves the shooting stability of the camera 400, as well as achieves miniaturization and lightweight design of the camera 400.

Figure 16:
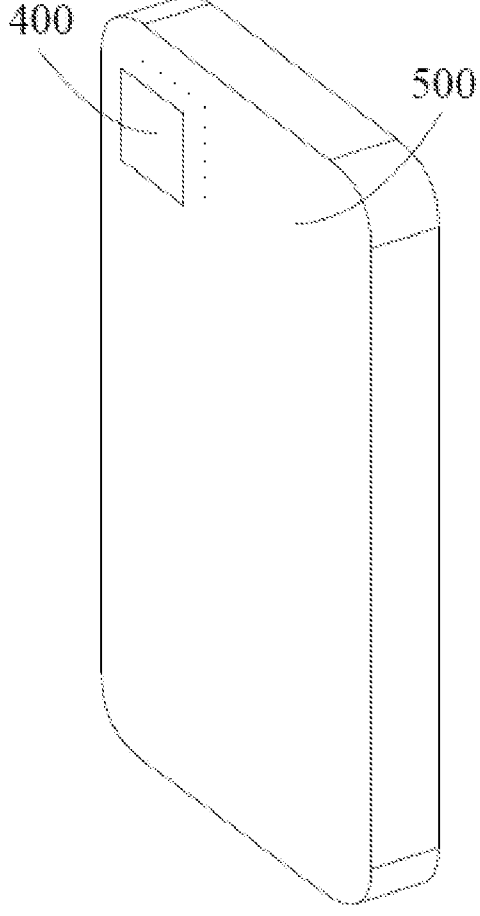
FIG. 16 is a three-dimensional schematic diagram of an electronic device according to a sixth embodiment of the present disclosure.

A fifth embodiment of the present disclosure provides an electronic device, as shown in FIG. 16, which includes a device body 500 and the camera 400.

Compared to the prior art, according to the sixth embodiment of the present disclosure, the camera 400 is disposed in a device body 500 of the electronic device, thereby improving the shooting performance of the electronic device.

It can be understood that electronic device may be a portable terminal, such as a mobile phone, a tablet, a smartwatch, etc., or may be a laptop or any other terminal.

It can be understood that the foregoing embodiments are specific embodiments for implementing the present disclosure, and in practical applications, various changes can be made in form and details without deviating from the spirit and scope of the present disclosure.

What is claimed is:

1. A shooting apparatus, comprising: an autofocus mechanism; and a lens assembly with an optical axis, wherein, the autofocus mechanism comprises: a first base with a receiving space; a support frame disposed in the receiving space and configured to fix the lens assembly; balls disposed between the support frame and the first base; and a focusing drive component configured to drive the lens assembly to move along a direction of the optical axis and comprising focusing coils and focusing magnets;

the autofocus mechanism further comprises: a first axial guide mechanism and a second axial guide mechanism disposed at intervals; wherein, the first axial guide mechanism comprises: a first receiving groove disposed on an outer side of the support frame; a first limiting groove disposed on an inner side of the first base; and a first ball disposed between the first receiving groove and the first limiting groove; and the second axial guide mechanism comprises: a second receiving groove disposed on the outer side of the support frame; a second limiting groove disposed on the inner side of the first base; and a second ball disposed between the second receiving groove and the second limiting groove;

the first receiving groove comprises a first receiving surface and a second receiving surface, a direction extending from the first receiving groove along a center line of an angle between the first receiving surface and the second receiving surface away from the lens assembly is a first direction; the second limiting groove comprises a second sliding surface and a third sliding surface, a direction extending from the second receiving groove along a center line of an angle between the second sliding surface and the third sliding surface away from the lens assembly is a second direction;

the autofocus mechanism further comprises: a plurality of fixing magnetic yokes; wherein, the plurality of fixing magnetic yokes and the focusing magnets attract each other, to apply a force to the first ball along the first direction, and apply a force to the second ball along the second direction;

the focusing magnets includes two first magnets, a second magnet and a third magnet, the plurality of fixing magnetic yokes includes two first yokes and a second yoke, wherein the first magnet, the second magnet and the third magnet have the same specifications, the first yoke and the second yoke have the same specifications, the two first magnets are disposed opposite to the two first yokes along a radius direction of the lens assembly, the second magnet is disposed opposite to the second yoke along the radius direction of the lens assembly.

2. The shooting apparatus according to claim 1, wherein the first receiving groove and the second receiving groove are disposed on two sides of the optical axis along the first direction.

3. The shooting apparatus according to claim 1, wherein the first receiving groove and the second receiving groove are V-shaped grooves.

4. The shooting apparatus according to claim 1, wherein on a cross section perpendicular to the optical axis, the second receiving groove comprises a first sliding surface perpendicular to the second direction, and the second limiting groove comprises a second sliding surface parallel to the first direction and a third sliding surface perpendicular to the first direction.

5. The shooting apparatus according to claim 1, wherein the first ball is one of two first balls, and the two first balls are disposed sequentially along a direction parallel to the optical axis.

6. The shooting apparatus according to claim 1, wherein the second ball is one of two second balls, and the two second balls are disposed sequentially along a direction parallel to the optical axis.

7. The shooting apparatus according to claim 1, wherein the focusing magnets are disposed on the first base, and the focusing coils are disposed on the support frame.

8. The shooting apparatus according to claim 1, wherein the focusing drive component is a voice coil motor.

9. The shooting apparatus according to claim 1, further comprising: an anti-shake mechanism; wherein, the anti-shake mechanism is configured to drive the autofocus mechanism to achieve anti-shake.

10. The shooting apparatus according to claim 9, further comprising: a periscope optical mechanism.

11. A camera, comprising: a camera body; and the shooting apparatus according to claim 1.

12. An electronic device, comprising: a device body; and the camera according to claim 11.

* * * * *